United States Patent [19]

Fasig

[11] 4,347,936
[45] Sep. 7, 1982

[54] BLACK BAND DETECTOR FOR DOCUMENT SORTING MACHINES

[75] Inventor: Harold A. Fasig, Plymouth, Mich.

[73] Assignee: Burroughs Corporation, Detroit, Mich.

[21] Appl. No.: 175,366

[22] Filed: Aug. 5, 1980

[51] Int. Cl.³ .......................................... B07C 5/342
[52] U.S. Cl. ................................. 209/3.3; 209/588; 209/900; 250/223 R
[58] Field of Search ............... 209/3.1, 3.3, 576, 577, 209/583, 584, 588, 900; 250/223 R

[56] References Cited

U.S. PATENT DOCUMENTS

| | | | |
|---|---|---|---|
| 3,759,382 | 9/1973 | Walkley et al. | 209/588 X |
| 3,895,220 | 7/1975 | Nelson et al. | 209/3.3 X |
| 4,016,980 | 4/1977 | DeHart et al. | 209/588 |
| 4,034,341 | 7/1977 | Isono et al. | 209/584 X |

Primary Examiner—Joseph J. Rolla
Attorney, Agent, or Firm—Delbert P. Warner; Kevin R. Peterson

[57] ABSTRACT

Apparatus for detecting black band separator documents placed as markers between batches of documents. The apparatus is responsive to four measurements which enable it to determine when a black band document has passed. These measurements relate to changes in the intensity of light transmitted through the document, the length of a black band, length of the document, and the position of the black band on the document.

10 Claims, 5 Drawing Figures

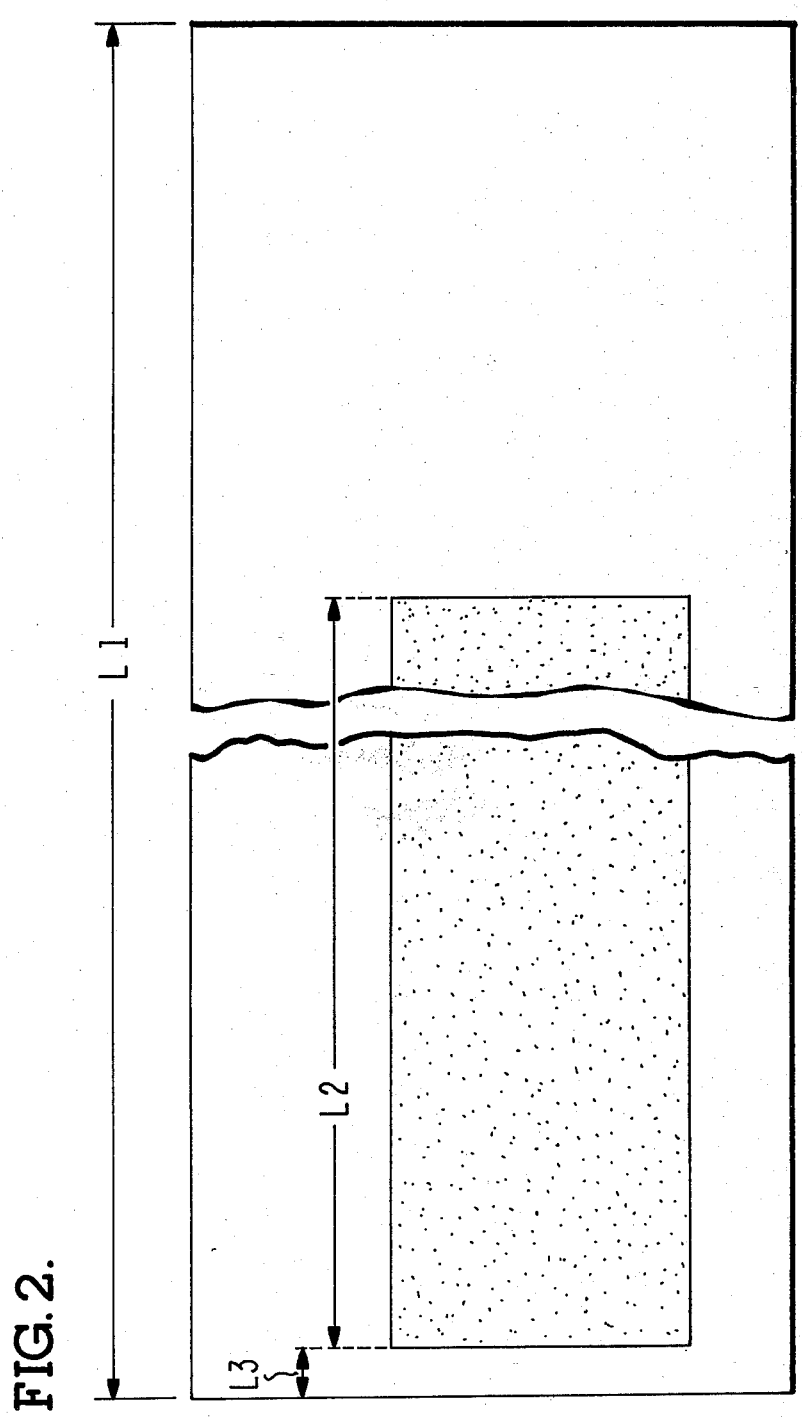

4,347,936

BLACK BAND DETECTOR FOR DOCUMENT SORTING MACHINES

BACKGROUND OF THE INVENTION

1. Field of the Invention

The invention relates to the control of document sorting machines. It relates particularly to systems employing black band detectors of use in detecting batch separator documents, or black band documents, on which a special black band is printed. When such a document passes certain detectors, signals generated by the detectors are provided to logic processing apparatus which determines from the signals when a document is a black band document and provides signals accordingly to control equipment enabling further speatation of the batches of documents in the sorting processes.

2. Description of the Prior Art

Among the prior art devices for separating documents into batches are black band detectors employed in cooperation with reflective type sensors which operate when they detect a decrease in reflected light from the black band portion of the document. Disadvantages found with the reflective designs include a need for periodic adjustment by field engineers, or other technical personnel, to maintain reliable operation. Another disadvantage of the prior art is that the mechanical arrangement is such that it is necessary to place a deflector in the transport path to position passing documents close to a focal plane at a fixed distance from the sensor assembly.

Designs based on detecting changes in light transmitted through a document, in accordance with the present invention, overcome the above mentioned shortcomings of the prior art while providing additional features which enhance overall operation and performance.

SUMMARY OF THE INVENTION

The invention relates to the detection of batches of documents and particularly to the location of boundaries between the batches. It employs means for sensing changes in light intensity as documents pass between a light source and a sensor. When a batch separator document bearing a special black band passes light sensors, changes in the light to the sensors cause variations in the sensors' output signals. The output signals are supplied to counter means which subject them to a number of tests to determine whether a black band document has passed and thus to establish whether a boundary between batches of documents has actually passed.

The testing procedures employ a number of counters which count output signals from the light sensors to determine whether the document is of a prescribed length, whether the black band is positioned within an allowable distance from the trailing edge of the document and whether the black band is of a prescribed length. In addition, a level detector is used to determine whether there has been a sufficient absorption of light to establish that a black band has been detected.

The invention may be described further as involving a system for detecting boundaries between moving batches of documents where the boundaries are marked by the presence of black band documents positioned between adjacent batches of documents to be sorted. A first light source and a first light sensor are spaced apart across the path of the documents to enable the first light sensor to detect the passage of documents between the light source and the sensor. A second light source and a second light sensor are spaced apart across the document path to enable the second light sensor to provide varying output signals as documents pass between the second light source and the second sensor along the document path. Finally, means responsive to said varying output signals are provided to establish when a black band document passes said light sensor, thereby establishing the existence of a boundary between adjacent batches of documents.

The invention also relates to means for adjusting the intensity of the second light source, including voltage regulating means, to enable the second light sensing device to provide a preselected output voltage as the leading edge of a document passes between the light source and the light sensing device.

BRIEF DESCRIPTION OF THE DRAWINGS

FIG. 2 is an illustration of a black band document of use in the practice of the invention.

DESCRIPTION OF A PREFERRED EMBODIMENT

Figure 1:
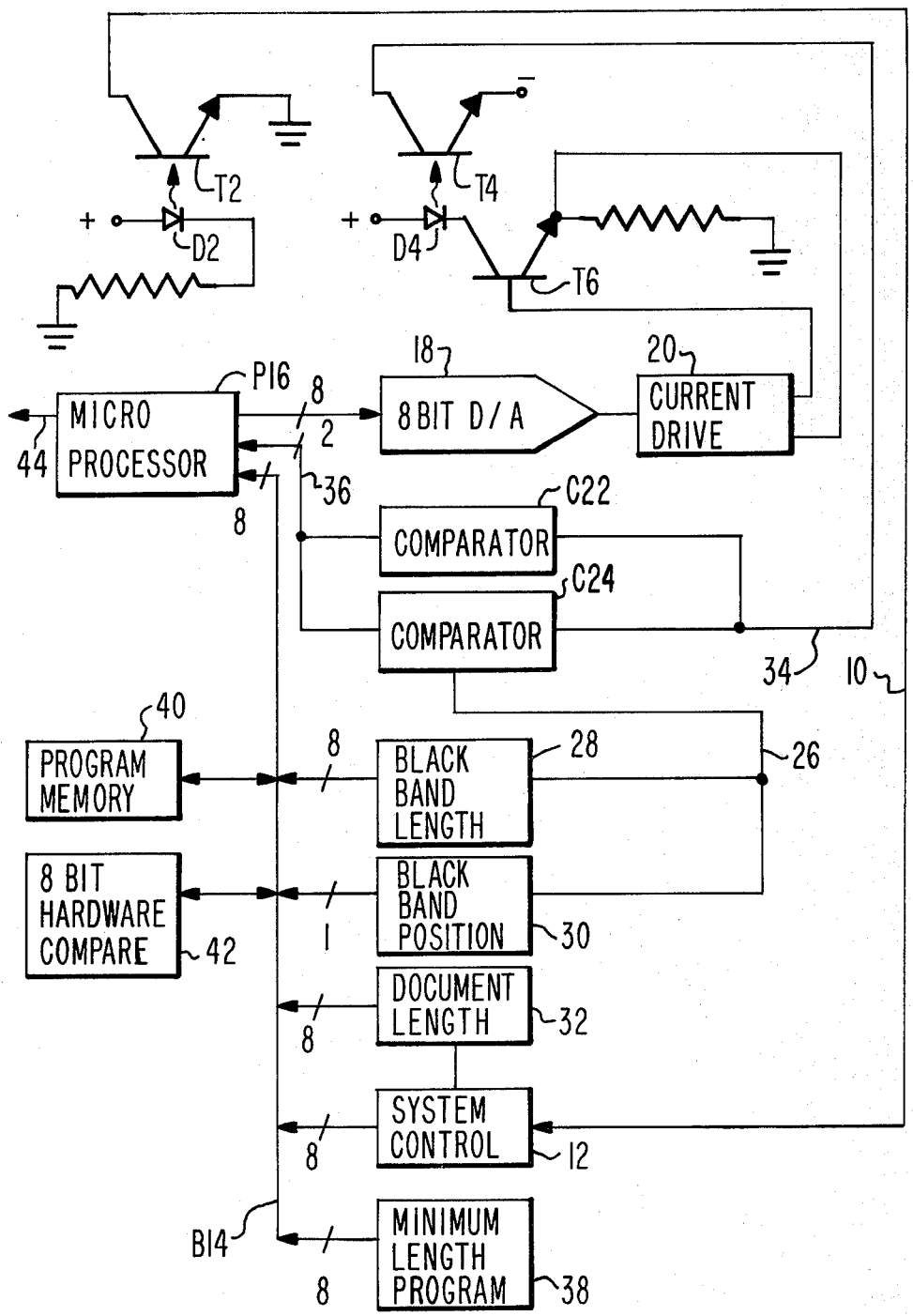
FIG. 1 is a block diagram illustrating a black band document detector in accordance with the invention.

Turning now to FIG. 1, a track sensor in the form of a phototransistor indicated at T2 is provided responsive to electromagnetic energy, which in a preferred case is infrared light, indicated by the wavy arrow from an LED at D2. The phototransistor T2 is a track sensor adjacent in position, along a document track, to the black band sensor T4. When no documents are present to obstruct light to T2 or T4, the system will be quiescent or "turned off". When a document passes between D2 and T2, changes in the signal from the collector terminal of T2 over the line 10 indicates the presence of a document in the track. This signal is supplied to an input port at 12, labelled "system control" which in turn provides a signal over bus B14 to a microprocessor P16, to turn the system "on". The port may be a 74LS244 and the microprocessor may be an 8048.

When a signal over B14 to the microprocessor P16 from input port 12 indicates a document is present in the track, the microprocessor starts a routine to adjust the current level of the phototransistor T4 to a predefined reference level which allows the detector to "look through" the passing document. This adjustment is made within the time it takes for the first quarter inch of document to travel past the detector T4 and, once set, is not changed while that document is present.

The predefined phototransistor current level referred to above is adjusted by a successive approximation routine performed by the microprocessor P16 in cooperation with the associated 8-bit digital-to-analog converter 18, the current driver circuit 20 and a transistor at T6, which drives the LED labelled D4 to the desired level. In order for the microprocessor to sequence through successive stages of the approximation routine, it monitors the output of a voltage comparator C22, which may preferably be part of an LM311. The inputs to this comparator C22 are received over line 34 from the collector of the phototransistor T4, and across a voltage divider network as shown at R2, R4 in FIG. 4, which provides an equivalent voltage reference to help establish the desired phototransistor collector current level. In this way, the LED at D4 is driven to whatever current level is required to produce the predefined phototransistor current while "looking through" the passing document.

Once the collector current reference level of T4 has been attained, the microprocessor monitors the output of a second voltage comparator C24, the output of which over lines 26 and 36 provides a direct indication of light transmission through the document including a four-to-one decrease in phototransistor collector current caused by the decrease in light transmission through the black band of a black band document. The output over bus 36 of the comparator C24 is available for use by the microprocessor. The output over 26 from the comparator is used by counter circuitry at 28 to measure the length of the passing black band and by counter circuitry at 30 to measure the distance from the black band to the trailing edge of the document. In addition, another counter at 32, connected through port 12 to the output of the associated track sensor T2, simultaneously measures the length of the document. The counters 28, 30 and 32 may preferably be synchronous 4-bit counters such as SN74LS161's.

After each document has passed, the microprocessor performs three tests to determine whether that particular document was a black band document. In the first test, the document length counter 32 is interrogated to insure that the document was of a standard length, L1 in FIG. 2, typically greater than or equal to 7 inches. In the second test, the black band length counter 28 is read to determine whether the black band was of a standard length (length L2 in FIG. 2), in a preferred embodiment 5±1/16 inches. Finally, the black band position counter 30 is tested to determine whether the trailing edge of the black band was within 5/16 inch (L3, FIG. 2) of the trailing edge of the document. If any of these tests fail, further tests are terminated, as indicated by the flow chart in FIG. 3A, 3B, since the document is not a black band document and should not be treated as such.

Figure 3A:
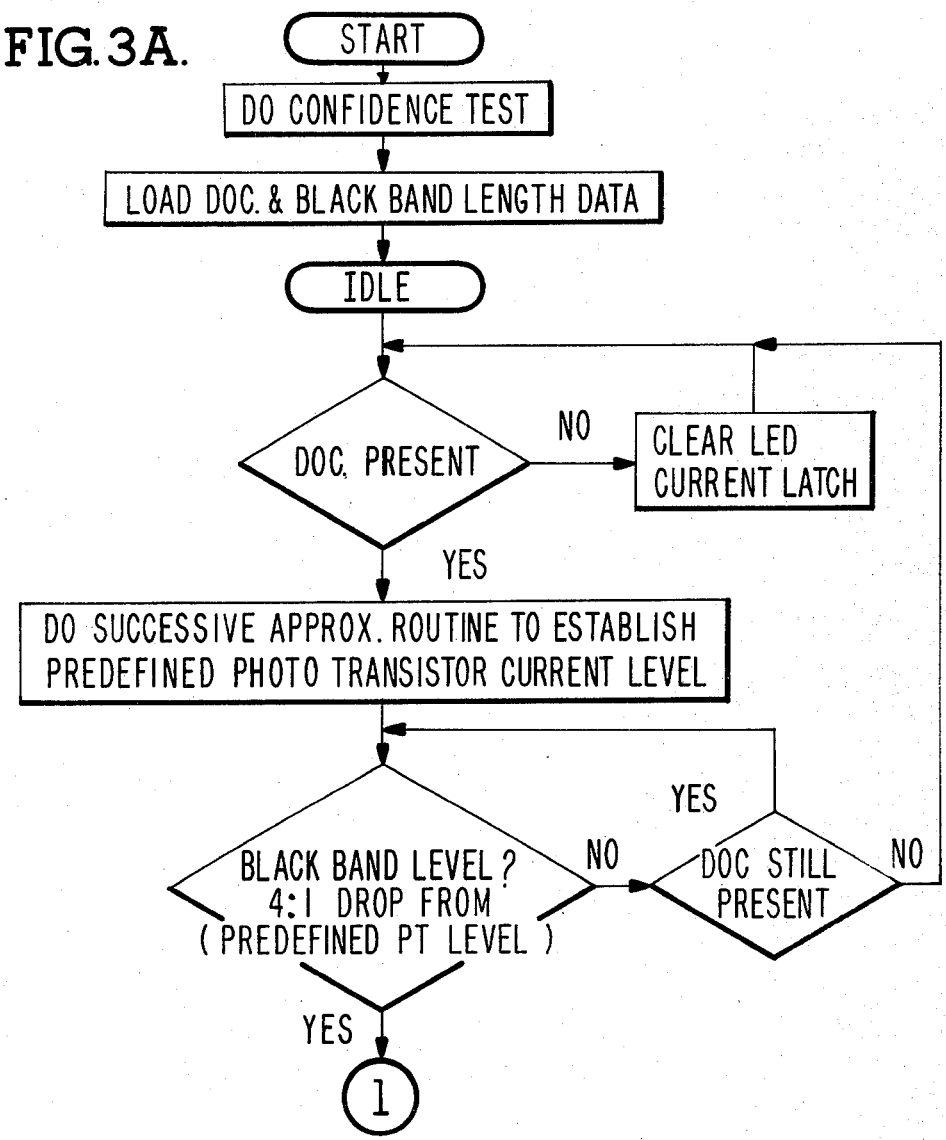
FIGS. 3A and 3B constitute a flow chart showing the manner of operation of a microprocessor used in the implementation of the invention.
Figure 3B:
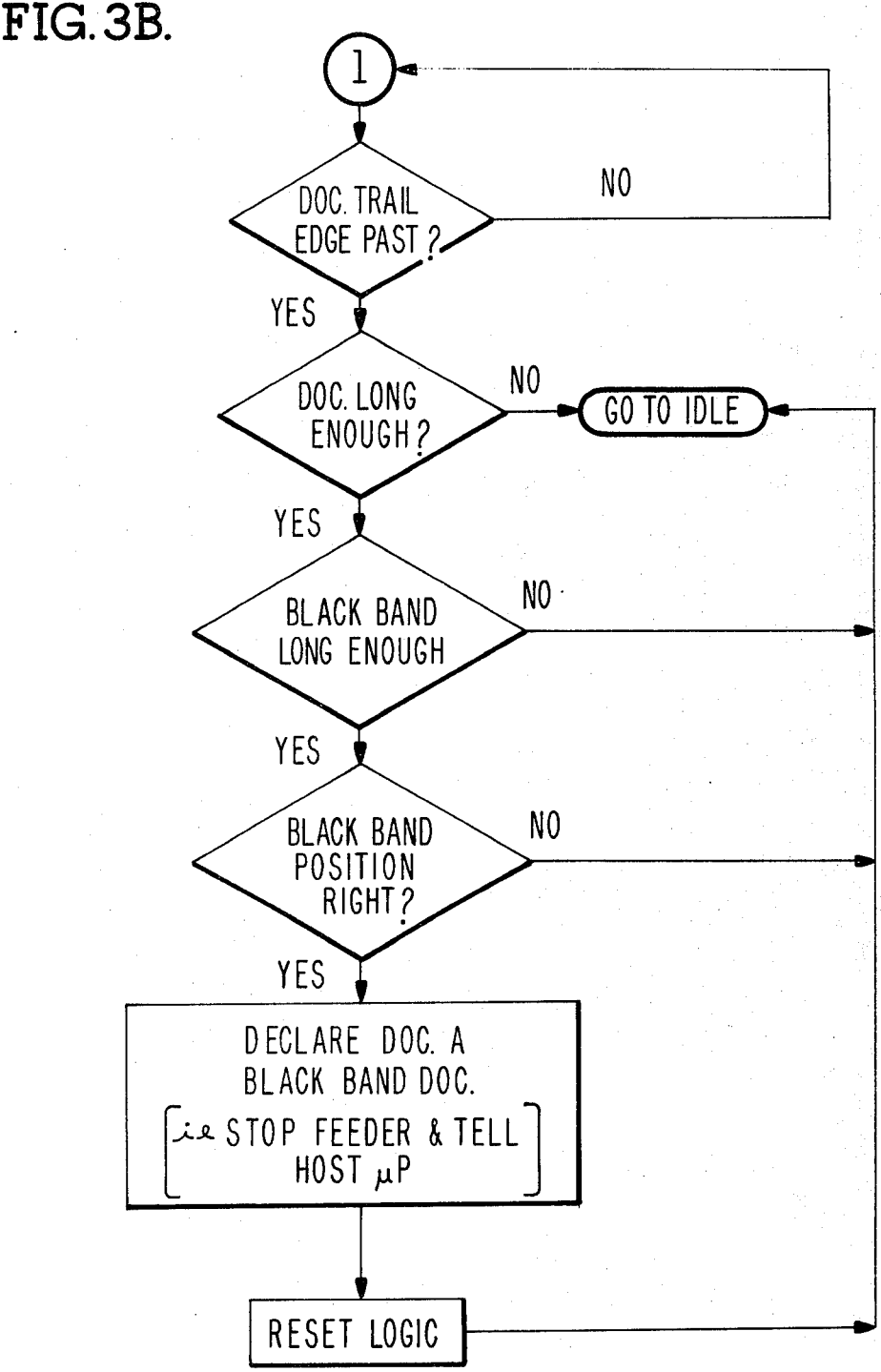

In the above circumstances, if the tests all indicate that a black band document has just passed, the document is identified as a black band document and the microprocessor issues control signals as indicated in the flow chart FIGS. 3A, 3B. These control signals may then be used to stop the feeding of subsequent documents and to send a status bit over a line such as is shown at 44 to the system central processor indicating that a black band document has been detected.

Whether or not a black band document has been found, after the tests are completed, the microprocessor resets all the logic in the system and sets the detector LED current to zero in preparation for the next document cycle. In this way, besides preparing to test the next document, a desirable power consumption duty cycle is provided.

The minimum length program identified at 38 relates to a program from a settable input port such as a 74LS244. The port 38 may be set to establish the length to which a document must conform as well as the length to which a black band must conform and the length of space between the edge of a document and the edge of a black band. This information is fed to the microprocessor over the bus B14 for use in testing whether the respective document, black band, black band lengths and the position of the black band are in accordance with requirements.

The program memory 40 represents a standard external program memory for an 8048 microprocessor such as may be used at P16.

Figure 4:
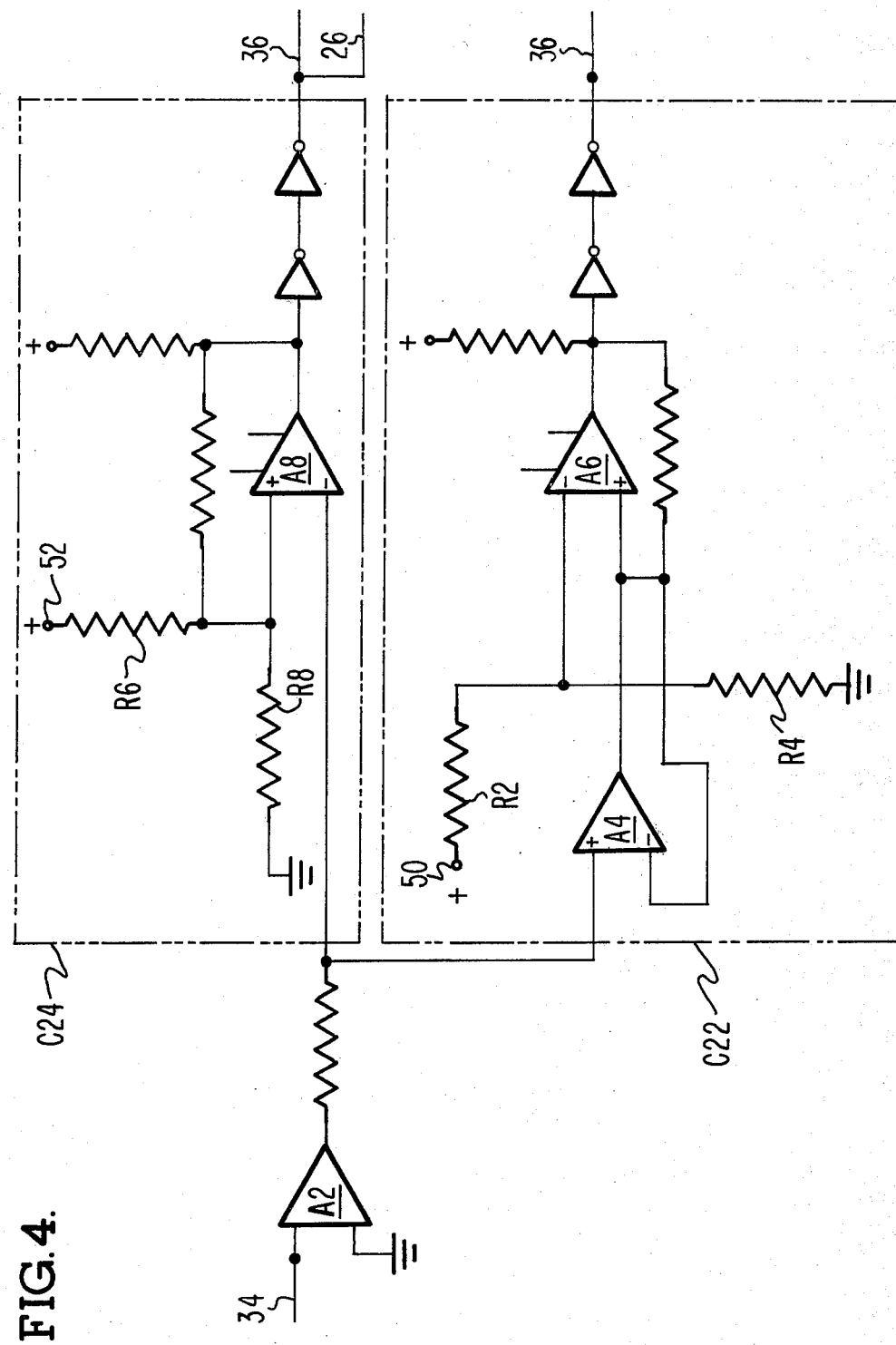
FIG. 4 is a diagram of a simplified circuit showing the application of reference potentials to comparators according to the invention.

Details of circuits of use with comparators C22 and C24 are shown in FIG. 4 where, for the sake of simplicity of explanation, they are represented by discrete amplifier circuits as distinct from the LM311's referred to above. The signal from the collector of the phototransistor is supplied over line 34 through an amplifier A2 as an input to both of the comparators C24 and C22.

The amplifier A4 of comparator C22 applied the amplified signal from A2 to the noninverting input terminal of amplifier A6. Amplifier A6 is biased by a positive potential from terminal 50 over precision biasing resistors R2 and R4 which provide a fixed biasing potential at the inverting input of A6. This biasing potential will typically be a positive potential of the order of 6 volts. Under influence of this biasing potential, the occurrence of a sufficiently high voltage (i.e., one exceeding 6 volts) from the phototransistor T4 to drive the amplifier A6 to a conductive state will cause A6 to provide a voltage at 36 indicating that the diode D4 is producing enough light to penetrate the document in the manner desired.

The amplifier A8 of comparator C24 is biased at its noninverting input terminal by a positive potential established from the positive terminal 52 over precision voltage dividing resistors R6 and R8 to provide a fixed positive reference potential, typically 1.5 volts, on the noninverting input terminal of A8. With this reference potential on its non-inverting terminal, the amplifier A8 is prevented from conducting by the incoming potential over 34 via A2 until that potential drops by a ratio of about four-to-one, i.e. typically down from about 6 volts to 1.5 volts, indicating that a black band has been encountered which absorbs much of the light from the LED. When the amplifier A8 conducts, it supplies potentials over 26 and 36 which indicate to the counters 28, 30 and to the microprocessor P16, respectively that a black band is present.

The 8-bit hardware compare device at 42 provides information relative to document length, black band length, and position of the black band which may be used by the microprocessor to make a quick comparison with information received from the respective counters to determine whether a document under test is a black band document or not.

What is claimed is:
1. A system for detecting the boundaries between moving batches of documents in which the boundaries are marked by the presence of black band documents positioned between adjacent batches of documents to be sorted, comprising:
 a first light source and a first light sensor spaced apart across a document path;
 said first light sensor detecting the passage of documents between the light source and the sensor;
 a second light source and a second light sensor spaced apart across the document path;
 means for adjusting the intensity of the second light source including voltage regulating means to enable the second light sensing device to provide a preselected output voltage as the leading edge of a document passes between the light source and the light sensing device;

said second light sensor providing varying output signals as documents pass between the second light source and the second sensor along the document path, and means responsive to said varying output signals to establish when a black band document passes said light sensor, thereby establishing the existence of a boundary between adjacent batches of documents.

2. The invention as claimed in claim 1, in which:

the varying output signals include intelligence indicating when the black band obstructs light from the light source to an extent causing substantially a four-to-one change in the signals available from the light sensor.

3. The invention as claimed in claims 1 or 2, in which:

the varying output signals indicate when the black band documents have a length equal to or greater than a prescribed linear measurement.

4. The invention as claimed in claim 3, in which:

the varying output signals indicate where the black bands have lengths of a prescribed value shorter than that of the black band documents.

5. The invention as claimed in claim 4, in which:

the varying output signals indicate when the black bands are positioned on the black band documents to have an accurately positioned edge near trailing edges of the black band documents.

6. A system for detecting the boundaries between moving batches of documents comprising:

a plurality of batch separator documents, serving as black band documents and bearing special black bands, arranged between adjacent batches of documents to be sorted;

a first light source and a first light sensor spaced apart across a document path;

said first light sensor detecting the passage of documents between the light source and the sensor;

a second light source and a second light sensor spaced apart across the document path;

means for adjusting the intensity of the second light source including voltage regulating means to enable the second light sensing device to provide a preselected output voltage as the leading edge of a document passes between the light source and the light sensing device;

said second light sensor providing varying output signals as documents pass between the second light source and the second sensor along the document path; and means responsive to said varying output signals to establish when a black band document passes said light sensor, thereby establishing the existence of a boundary between adjacent batches of documents.

7. The invention as claimed in claim 6, in which:

the means responsive to said varying output signals to establish when a black band document passes said light sensor includes a level detector sensitive to signals indicating the occurrence of an obstruction of light from the light source by the black band, whereby a reduction in light by a factor causing a substantial decrease in the signals produced by the light sensor indicates the presence of a black band.

8. The invention as claimed in claim 7, in which said means comprises:

a counter responsive to selected output signals to measure the length of a document and provide an output indicative of whether the document is within a prescribed range of lengths.

9. The invention as claimed in claim 7 or 8 in which said means comprises:

a counter sensitive to measure the position of the black band relative to the trailing edge of the black band document and provide an output indicative of whether the black band is positioned within a prescribed distance of the trailing edge.

10. The invention as claimed in claim 9, in which said means comprises:

a counter responsive to said output signals to measure the length of said black band and provide an output indicative of whether the black band is of a prescribed length, or not.

* * * * *